(12) United States Patent
McKinzie et al.

(10) Patent No.: US 12,474,044 B2
(45) Date of Patent: Nov. 18, 2025

(54) CEILING FAN WITH ENHANCED LIGHTING CAPABILITIES AND RELATED METHODS

(71) Applicant: Delta T, LLC, Lexington, KY (US)

(72) Inventors: Marc McKinzie, Lexington, KY (US);
Daniel Dalton, Lexington, KY (US);
Richard Lenser, Lexington, KY (US);
Andrew Koukis, Danville, KY (US)

(73) Assignee: Delta T, LLC, Lexington, KY (US)

( * ) Notice: Subject to any disclaimer, the term of this patent is extended or adjusted under 35 U.S.C. 154(b) by 72 days.

(21) Appl. No.: 17/886,934

(22) Filed: Aug. 12, 2022

(65) Prior Publication Data

US 2023/0047172 A1 Feb. 16, 2023

Related U.S. Application Data

(60) Provisional application No. 63/232,929, filed on Aug. 13, 2021.

(51) Int. Cl.
*F21V 33/00* (2006.01)
*F04D 25/08* (2006.01)
*F21Y 113/00* (2016.01)
*F21Y 113/13* (2016.01)

(52) U.S. Cl.
CPC ........ *F21V 33/0096* (2013.01); *F04D 25/088* (2013.01); *F21Y 2113/13* (2016.08); *F21Y 2113/30* (2023.05)

(58) Field of Classification Search
None
See application file for complete search history.

(56) References Cited

U.S. PATENT DOCUMENTS

| | | | |
|---|---|---|---|
| 4,422,824 A | 12/1983 | Eisenhardt, Jr. |
| 5,082,422 A | 1/1992 | Wang |
| 5,151,011 A | 9/1992 | Rezek |
| 5,795,131 A | 8/1998 | Crowhurst et al. |
| 6,120,262 A | 9/2000 | McDonough et al. |
| 6,160,956 A | 12/2000 | Pelonis |
| 6,244,820 B1 | 6/2001 | Yilmaz |
| 6,461,032 B2 | 10/2002 | McKinley |

(Continued)

FOREIGN PATENT DOCUMENTS

| | | |
|---|---|---|
| CN | 201575354 U | 9/2010 |
| KR | 101578043 B1 | 12/2015 |
| WO | 2010026441 A1 | 3/2010 |

*Primary Examiner* — Juan G Flores
(74) *Attorney, Agent, or Firm* — Dickinson Wright PLLC; Andrew D. Dorisio (57) ABSTRACT

A ceiling fan includes a rotatable hub adapted to be suspended from the ceiling. The hub includes at least one fan blade adapted for rotating with the hub. An uplight module is provided having a plurality of different lights, each of the plurality of lights for producing a different type of light incident on the ceiling. The uplight module may include a modular circuit board assembly comprising a main board including one or more LEDs and one or more auxiliary boards connected to the main board and including one or more UV LEDs, whereby adaptation for producing germicidal energy can be achieved without dismounting the ceiling fan from the ceiling. A controller may be provided for controlling the light intensity or temperature, including from pre-selected values. Related methods are also disclosed.

8 Claims, 11 Drawing Sheets

(56) References Cited

U.S. PATENT DOCUMENTS

| | | |
|---|---|---|
| 6,656,424 B1 | 12/2003 | Deal |
| 7,763,212 B2 | 7/2010 | McEllen |
| 7,879,299 B2 | 2/2011 | McEllen |
| 8,080,203 B2 | 12/2011 | First et al. |
| 8,080,819 B2 | 12/2011 | Mueller et al. |
| 8,207,821 B2 | 6/2012 | Roberge et al. |
| 9,393,338 B2 | 7/2016 | Livchak et al. |
| 9,707,310 B2 | 7/2017 | Watanabe et al. |
| 9,901,038 B2 | 2/2018 | Akana |
| 10,012,375 B1 | 7/2018 | Salessi |
| 10,125,971 B2 | 11/2018 | Graziano et al. |
| 10,207,019 B2 | 2/2019 | Takasahara et al. |
| 10,498,099 B2 | 12/2019 | Walker et al. |
| 10,502,407 B1 | 12/2019 | Spiro |
| 10,808,964 B2 | 10/2020 | Polidoro |
| 10,897,806 B1 | 1/2021 | Bucher et al. |
| 10,987,440 B1 | 4/2021 | Sood et al. |
| 11,027,038 B1 | 6/2021 | Rhoades et al. |
| 11,060,712 B2 | 7/2021 | Niemiec et al. |
| 11,135,333 B1 | 10/2021 | Sood et al. |
| 11,236,753 B1 | 2/2022 | Campbell |
| 2005/0058584 A1 | 3/2005 | Shyu |
| 2009/0053059 A1 | 2/2009 | Lung-Fa |
| 2009/0122572 A1 | 5/2009 | Page et al. |
| 2009/0129974 A1 | 5/2009 | McEllen |
| 2012/0126134 A1 | 5/2012 | Deal et al. |
| 2012/0199005 A1 | 8/2012 | Koji et al. |
| 2012/0313014 A1 | 12/2012 | Stibich et al. |
| 2013/0272879 A1 | 10/2013 | Chen |
| 2013/0291735 A1 | 11/2013 | Livchak et al. |
| 2013/0343052 A1 | 12/2013 | Yen |
| 2015/0009666 A1 | 1/2015 | Keng et al. |
| 2015/0110625 A1 | 4/2015 | De Siqueira Indio Da Costa et al. |
| 2017/0089346 A1 | 3/2017 | Oleson et al. |
| 2017/0248148 A1 | 8/2017 | Kohen |
| 2018/0055959 A1 | 3/2018 | Lin |
| 2019/0264702 A1 | 8/2019 | Huggins et al. |
| 2019/0345946 A1 | 11/2019 | Register et al. |
| 2020/0018469 A1 | 1/2020 | Kohen |
| 2020/0197550 A1 | 6/2020 | Barron et al. |
| 2020/0332969 A1 | 10/2020 | Soler et al. |
| 2020/0340487 A1 | 10/2020 | Register et al. |
| 2020/0366125 A1 | 11/2020 | Chen |
| 2020/0396295 A1* | 12/2020 | Martin ................. A61B 5/4803 |
| 2021/0016216 A1 | 1/2021 | Popa-Simil et al. |
| 2021/0219393 A1 | 7/2021 | Kerr et al. |
| 2021/0353813 A1* | 11/2021 | Wald ........................ A61L 9/20 |

\* cited by examiner

CEILING FAN WITH ENHANCED LIGHTING CAPABILITIES AND RELATED METHODS

This application claims the benefit of U.S. Provisional Patent Application Ser. No. 63/232,929, filed Aug. 13, 2021, the disclosure of which is incorporated herein by reference. This application is related to U.S. Application Ser. Nos. 63/054,871, 63/010,274, 63/039,788, and 63/123,595, the disclosures of which are incorporated herein by reference.

TECHNICAL FIELD

This document relates generally to ceiling fans and, more particularly, to a ceiling fan with enhanced lighting capabilities.

BACKGROUND

A variety of fan systems have been made and used over the years in a variety of contexts. For instance, various ceiling fans are disclosed in U.S. Pat. No. 7,284,960, entitled "Fan Blades," issued Oct. 23, 2007; U.S. Pat. No. 6,214,821, entitled "Low Speed Cooling Fan," issued Jun. 12, 2001; U.S. Pat. No. 6,939,108, entitled "Cooling Fan with Reinforced Blade," issued Sep. 6, 2005; and U.S. Pat. No. D607,988, entitled "Ceiling Fan," issued Jan. 12, 2010. The disclosures of each of those U.S. patents are incorporated by reference herein. Additional exemplary fans are disclosed in U.S. Pat. No. 8,079,823, entitled "Fan Blades," issued Dec. 20, 2011; U.S. Pat. Pub. No. 2009/0208333, entitled "Ceiling Fan System with Brushless Motor," published Aug. 20, 2009; and U.S. Pat. Pub. No. 2010/0278637, entitled "Ceiling Fan with Variable Blade Pitch and Variable Speed Control," published Nov. 4, 2010, the disclosures of which are also incorporated by reference herein. It should be understood that teachings herein may be incorporated into any of the fans described in any of the above-referenced patents, publications, or patent applications.

A fan blade or airfoil may include one or more upper air fences and/or one or more lower air fences at any suitable position(s) along the length of the fan blade or airfoil. Merely exemplary air fences are described in U.S. Pat. Pub. No. 2011/0081246, entitled "Air Fence for Fan Blade," published Apr. 7, 2011, the disclosure of which is incorporated by reference herein. Alternatively, any other suitable type of component or feature may be positioned along the length of a fan blade or airfoil; or such components or features may simply be omitted.

The outer tip of a fan blade or airfoil may be finished by the addition of an aerodynamic tip or winglet. Merely exemplary winglets are described in U.S. Pat. No. 7,252,478, entitled "Fan Blade Modifications," issued Aug. 7, 2007, the disclosure of which is incorporated by reference herein. Additional winglets are described in U.S. Pat. No. 7,934,907, entitled "Cuffed Fan Blade Modifications," issued May 3, 2011, the disclosure of which is incorporated by reference herein. Still other exemplary winglets are described in U.S. Pat. No. D587,799, entitled "Winglet for a Fan Blade," issued Mar. 3, 2009, the disclosure of which is incorporated by reference herein. In some settings, such winglets may interrupt the outward flow of air at the tip of a fan blade, redirecting the flow to cause the air to pass over the fan blade in a perpendicular direction, and also ensuring that the entire air stream exits over the trailing edge of the fan blade and reducing tip vortex formation. In some settings, this may result in increased efficiency in operation in the region of the tip of the fan blade. In other variations, an angled extension may be added to a fan blade or airfoil, such as the angled airfoil extensions described in U.S. Pat. Pub. No. 2008/0213097, entitled "Angled Airfoil Extension for Fan Blade," published Sep. 4, 2008, and issued Apr. 24, 2012 as U.S. Pat. No. 8,162,613, the disclosure of which is incorporated by reference herein. Other suitable structures that may be associated with an outer tip of an airfoil or fan blade will be apparent to those of ordinary skill in the art. Alternatively, the outer tip of an airfoil or fan blade may be simply closed (e.g., with a cap or otherwise, etc.), or may lack any similar structure at all.

The interface of a fan blade and a fan hub may also be provided in a variety of ways. For instance, various interfaces are described in U.S. Pat. Pub. No. 2009/0081045, entitled "Aerodynamic Interface Component for Fan Blade," published Mar. 26, 2009 and issued Apr. 3, 2012 as U.S. Pat. No. 8,147,204; and U.S. Provisional Patent App. No. 61/590,469, entitled "Fan with Resilient Hub," filed Jan. 25, 2012, the disclosure of which is incorporated by reference herein. In addition, or in the alternative, the fan blade may include a retention system that couples the tip of a fan blade to an attachment point on the fan hub via a cable running through the fan blade, such as that disclosed in U.S. Pat. Pub. No. 2011/0262278, entitled "Fan Blade Retention System," published Oct. 27, 2011. Alternatively, the interface of a fan blade and a fan hub may include any other component or components, or may lack any similar structure at all.

It should also be understood that a fan may include sensors or other features that are used to control, at least in part, operation of a fan system. For instance, such fan systems are disclosed in U.S. Pat. Pub. No. 2009/0097975, entitled "Ceiling Fan with Concentric Stationary Tube and Power-Down Features," published Apr. 16, 2009, and issued Apr. 3, 2012 as U.S. Pat. No. 8,147,182, the disclosure of which is incorporated by reference herein; U.S. Pat. Pub. No. 2009/0162197, entitled "Automatic Control System and Method to Minimize Oscillation in Ceiling Fans," published Jun. 25, 2009, and issued Feb. 28, 2012 as U.S. Pat. No. 8,123,479, the disclosure of which is incorporated by reference herein; U.S. Pat. Pub. No. 2010/0291858, entitled "Automatic Control System for Ceiling Fan Based on Temperature Differentials," published Nov. 18, 2010, the disclosure of which is incorporated by reference herein; and U.S. Provisional Patent App. No. 61/165,582, entitled "Fan with Impact Avoidance System Using Infrared," filed Apr. 1, 2009, the disclosure of which is incorporated by reference herein. Alternatively, any other suitable control systems/features may be used in conjunction with embodiments described herein.

In some environments, it is desirable to sterilize the air and/or remove airborne diseases and disease vectors from the air. Existing methods for reducing airborne disease transmission between room occupants include fresh air ventilation, filtration, and direct deactivation/destruction methods such as irradiation or oxidation of the pathogens themselves. For instance, this can be achieved through the use of ultraviolet radiation (in the form of light having a particular range of short wavelengths, such as between about 200 nm and 300 nm, and is often referred to as ultraviolet germicidal irradiation (UVGI)). UVGI is a disinfection method that uses ultraviolet (UV) light at sufficiently short wavelength to kill pathogens. It is used in a variety of applications, such as food, air and water purification. UVGI utilizes short-wavelength ultraviolet radiation (UV-C) that is harmful to microorganisms. It is effective in destroying the nucleic acids in these organisms so that their DNA is disrupted by the UV radiation, leaving them unable to perform vital cellular functions. In this regard, the disclosure of U.S. Pat. No. 8,481,985 is incorporated herein by reference.

As can be appreciated, any germicidal fixture positioned in a space at a fixed location may be somewhat effective, but obviously limited in efficacy given its stationary nature (and the use of multiple stationary devices may be considered costly and inefficient in most applications) and its location away from a source of air movement, such as a fan. In many applications, such stationary devices do not receive enough airflow as a result of circulation because a typical fan is designed to force air toward the floor, and not necessarily near or toward any generator(s) of germicidal energy (which would typically be mounted on the ceiling or walls). Furthermore, many of past approaches are not implemented successfully due to lack of operator training, maintenance issues, sub-par user interfaces and experiences, cost, and are not well-adapted for retrofitting to existing fans.

Moreover, traditional ceiling fans are sometimes used to provide regular lighting in a given space. However, existing options are typically limited to providing downlighting only. Past efforts at providing fan lighting also typically provide only a single color of uplight that is incident on the ceiling to which the fan is mounted, which limits the options available to the user.

Accordingly, a need is identified for an improved manner of providing a fan with enhanced lighting capabilities. In particular, the fan would be adapted to have an uplight for providing different types of lighting as chosen by the user or during the manufacturing process (by using a modular circuit board assembly), as well as potentially further providing traditional downlighting. Furthermore, the uplight may be adapted to provide sterilizing or germicidal radiation (e.g., UVGI and UV-C in particular), such as in a selective manner.

SUMMARY

According to a first aspect of this disclosure, a ceiling fan for suspending from a ceiling includes a hub adapted to be suspended from the ceiling, the hub including at least one fan blade adapted for rotating with the hub. The ceiling fan includes an uplight module having a plurality of lights, each of the plurality of lights adapted to produce a different type of light incident on the ceiling.

In one embodiment, the plurality of lights comprise at least two LEDs, each for producing light of a different color temperature. A controller may be adapted for toggling between the different color temperatures of light. Additionally or alternatively, the plurality of lights may comprise LEDs of different colors and/or one or more UV LEDs. In one particular arrangement, the plurality of lights comprise at least two LEDs for producing light of different temperatures, red, green, and blue LEDS, and at least one UV-C LED.

In any embodiment, the plurality of lights may comprise LEDs on a main circuit board and one or more UV LEDs on an auxiliary circuit board connected to the main circuit board. The auxiliary circuit board may be connected to the main circuit board radially outwardly of the main circuit board. A tray may be provided for supporting the plurality of lights. In addition to an uplight module, the fan may include a downlight module, which may have one or more LEDs of any type described herein.

A further aspect of the disclosure pertains to a circuit board assembly. The circuit board assembly includes a main circuit board having a generally polygonal perimeter and at least one auxiliary circuit board attached to the generally polygonal perimeter of the main circuit board (the terms "main" and "auxiliary" connoting no particular size, shape, or importance in terms of the function provided). In one particular version, the main circuit board comprises one or more LEDs and the at least one auxiliary circuit board comprises one or more UV LEDs. The main circuit board perimeter may be generally triangular or hexagonal, and the assembly may include a plurality of auxiliary circuit boards, which may be D-shaped in plan view. A central opening in the main circuit board may also be provided for receiving a support adapted to connect a ceiling fan to a ceiling.

A further aspect of the disclosure pertains to a circuit board assembly. The circuit board assembly according to this further aspect includes a main circuit board having a generally polygonal perimeter, and at least one auxiliary circuit board attached to the main circuit board. The at least one auxiliary circuit board may comprise at least one LED for producing UV light, such as in order to achieve a germicidal effect.

Yet another aspect of the disclosure is a circuit board assembly, comprising an annular circuit board comprising a plurality of interconnected boards, at least one of which includes a generally polygonal perimeter. The circuit board assembly may include a main circuit board having the portion with the generally polygonal perimeter, and at least one auxiliary circuit board attached to the main circuit board along a portion of the generally polygonal perimeter. A ceiling fan may include the circuit board assembly of any embodiment herein.

This disclosure also relates to an apparatus for dissipating heat from a circuit board having one or more LEDs thereon. The apparatus comprises a plurality of first projections extending in a first direction, and a plurality of second projections extending in a second direction generally transverse to the first direction. The circuit board may be annular, the first direction may be radial, and the second direction may be vertical. In one version, the circuit board comprises a main portion and an auxiliary portion, the first projections being associated with both the main and auxiliary portions, and the second projections being associated with only the auxiliary portion. The apparatus may be associated with a ceiling fan.

Still a further aspect of the disclosure is a fan for mounting to a ceiling, comprising a rotatable hub including a plurality of blades, a support for supporting the fan from the ceiling, and a lighting assembly including a first circuit board surrounding the support and a second circuit board attached to the first circuit board. The second circuit board may be located radially outward of the first circuit board, which may comprise a generally polygonal perimeter. The second circuit board may be generally D-shaped in plan view.

The fan may further include a tray having a recess for receiving the first circuit board and the second circuit board and a raised peripheral lip. A plurality of second circuit boards may be attached to the first circuit board. The main circuit board may comprise one or more LEDs and the second circuit board(s) comprises one or more UV-LEDs.

The lighting assembly may comprise a heat sink including a plurality of radially extending fins associated with at least the first circuit board and a plurality of vertically extending projections associated with the second circuit board. The lighting assembly may comprise an uplight located above the hub. A downlight may also be provided.

A further aspect of the disclosure pertains to a ceiling fan, comprising an uplight module adapted to generate UV light, and a controller adapted to control the intensity of the UV light output from the uplight module from among preselected values. The controller may comprise switches for controlling the intensity of the UV light output from the up light module.

Still a further aspect of the disclosure pertains to a method comprising projecting a plurality of different types of light upwardly from a ceiling fan so as to be incident on the ceiling. The plurality of different types of light may comprise light of different temperatures, colors, germicidal capabilities, or any combination thereof. The method may further comprise the step of projecting light downwardly from the ceiling fan.

Another aspect of the disclosure relates to a method of manufacturing a ceiling fan. The method comprises passing a support for the ceiling fan through a circular opening in a main circuit board for controlling the ceiling fan, and attaching one or more auxiliary circuit boards to the main circuit board. The main circuit board may comprise one or more LEDs, and at least one of the one or more auxiliary circuit boards may comprise a UV LED. The attaching step may comprise connecting the one or more auxiliary circuit boards to a perimeter of the main circuit board.

BRIEF DESCRIPTION OF THE DRAWING FIGURES

While the specification concludes with claims which particularly point out and distinctly claim the invention, it is believed the aspects of the disclosure will be better understood from the following description of certain examples taken in conjunction with the accompanying drawings, in which like reference numerals identify the same elements and in which:

In the following detailed description, reference is made to the accompanying drawings that form a part hereof, and in which is shown by way of illustration, specific embodiments in which the invention may be practiced. These embodiments are described in sufficient detail to enable those skilled in the art to practice the embodiments and like numerals represent like details in the various figures. Also, it is to be understood that other embodiments may be utilized, and that process or other changes may be made without departing from the scope of the disclosure. The following detailed description is not to be taken in a limiting sense, and the scope of the invention is defined only by the appended claims and their equivalents.

DETAILED DESCRIPTION

Figure 1:
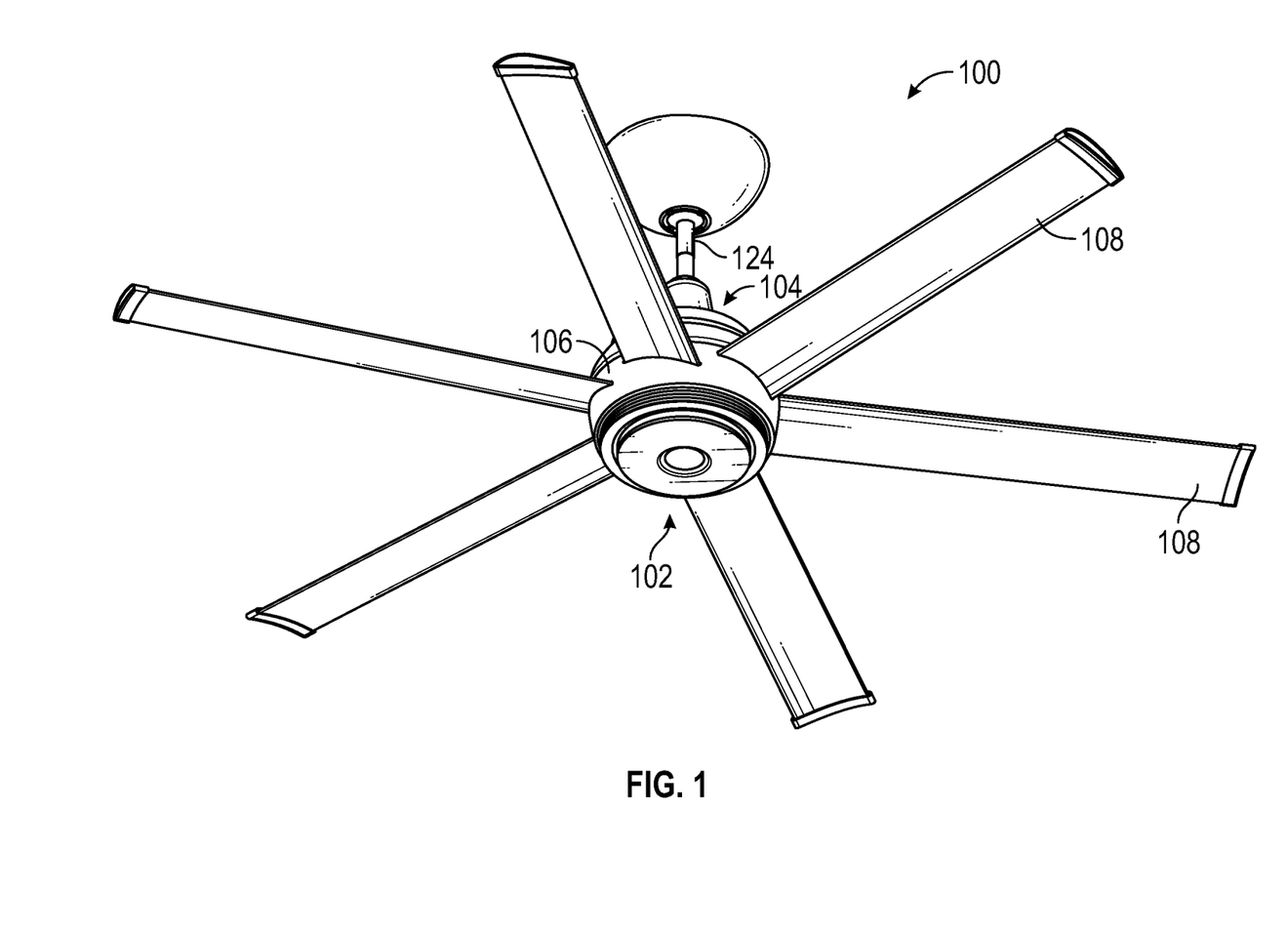
FIG. 1 depicts a bottom perspective view of an exemplary fan.
Figure 2:
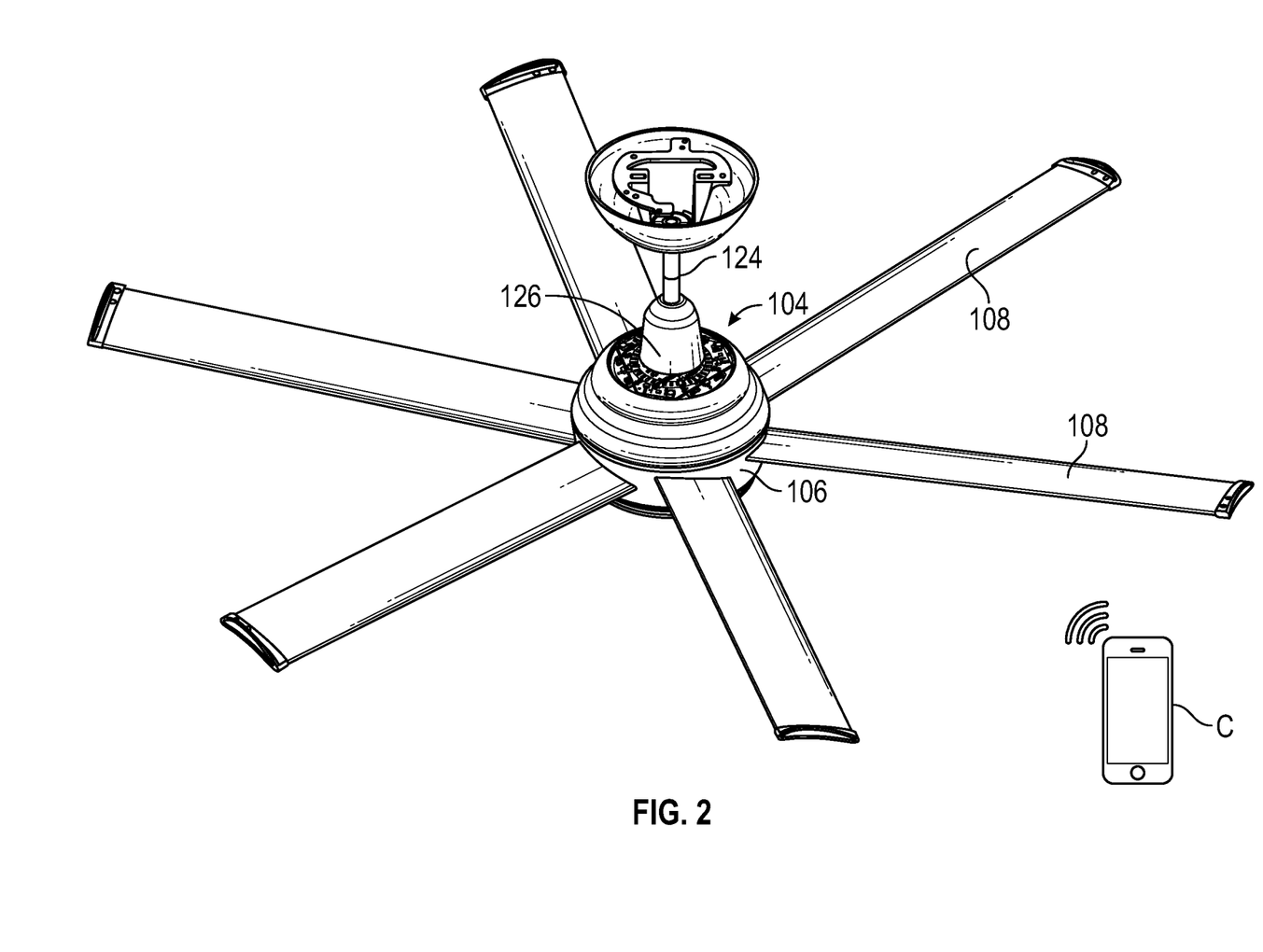
FIG. 2 depicts a top perspective view of an exemplary fan.
Figure 3:
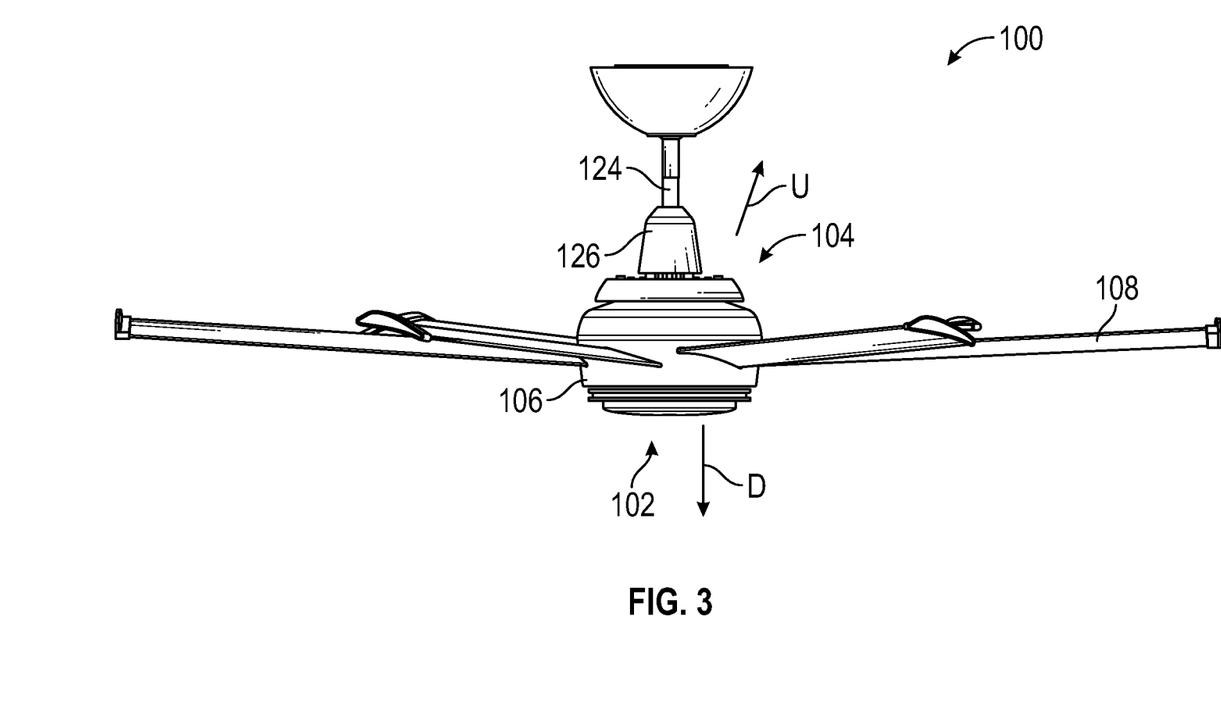
FIG. 3 depicts a side view of an exemplary fan.

According to one aspect of the disclosure, a ceiling fan 100 is shown in FIGS. 1-3 that provides both uplight and downlight, such as via a downlight module or assembly 102 and an uplight module or assembly 104 (note arrows U for uplight (which may be generally vertical) and D for downlight (likewise) in FIG. 3). The downlight module 102 may be located below a hub 106 carrying a plurality of fan blades 108 and associated with a motor (not shown). As perhaps best shown in FIGS. 2 and 3, the uplight module 104 may be located above the hub 106, which may rotate relative to the modules 102, 104, which remain stationary.

Figure 4:
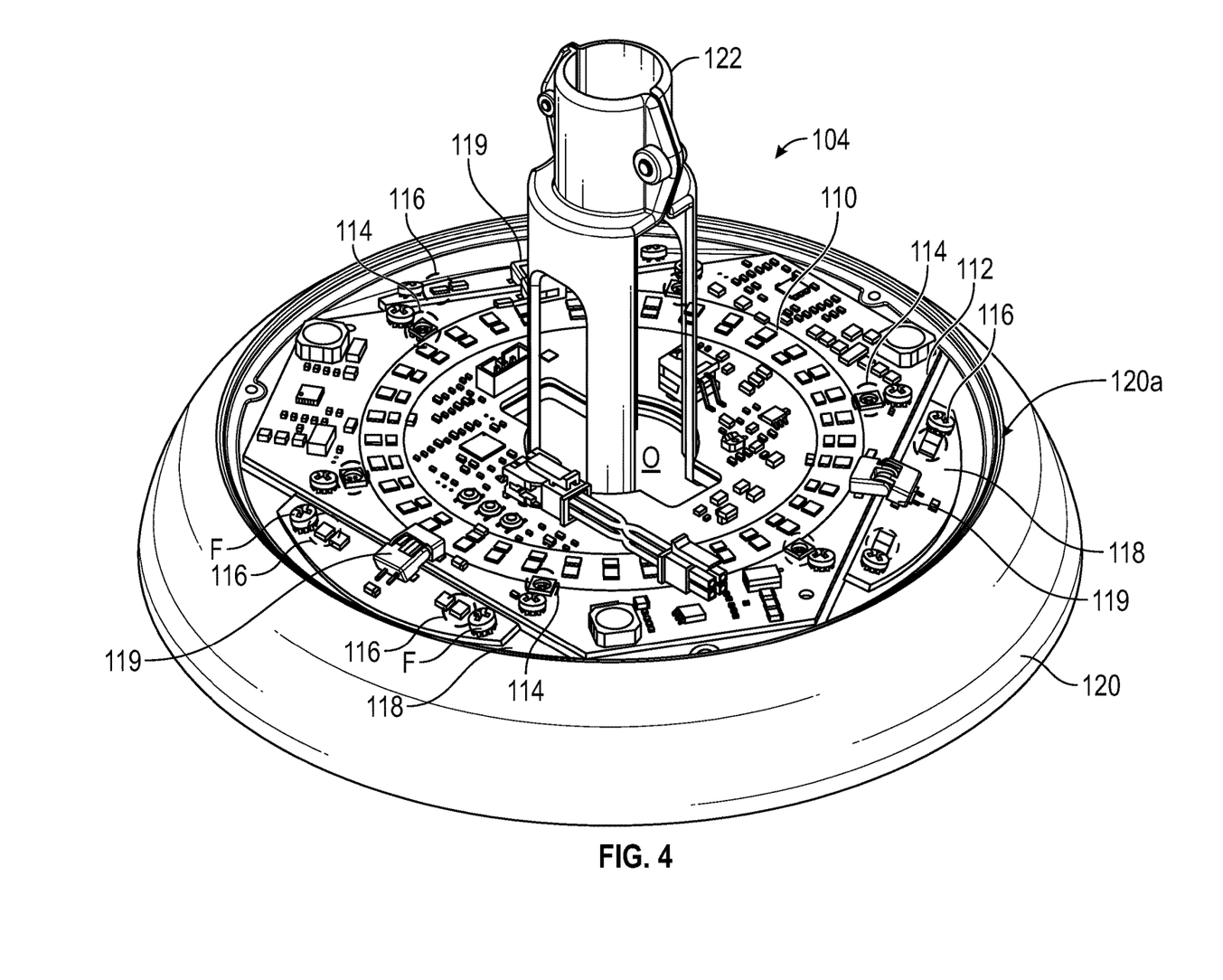
FIG. 4 is a top perspective view of a lighting module.

Turning to FIG. 4, the uplight module 104 may be adapted to provide a plurality of different types of lighting directed toward and incident on the ceiling to which it is connected. For example, the module 104 may comprise a plurality of lights, such as LEDs 110, arranged on a circuit board 112 (e.g., a PCBA). The LEDs 110 may be adapted to emit light at different temperatures (e.g., 2,700 K and 4,000 K). These LEDs 110 for producing different types of light may be arranged in concentric rows, as shown, but could be provided in other arrangements as well. The user may be able to toggle between two (or more) color temperature options via remote control C (including a mobile computing device running a suitable control application), wall control, or the like, as indicated in FIG. 2. Suitable dimming capabilities may also be provided by the control C in order to control the intensity of the light provided.

The uplight module 104 may further include additional colored lights. For example, these lights may comprise red, green, and blue LEDS 114 adapted for producing light directed toward and incident on the ceiling. These LEDs 114 may be provided on the same circuit board 112 as the LEDs 110, as shown. By activating these LEDs 114, a user may toggle from among a plurality of colors (e.g., seven colors, such as red, orange, yellow, green, teal, purple and fuschia/pink). The user may also be able to toggle between the two color temperature options via remote control C (including a mobile computing device running a suitable control application), wall control, or the like, which as noted above may also provide dimming.

The uplight module 104 may also be provided with one or more lights for generating germicidal energy, such as for example UV (e.g., UV-C) LEDs 116 for generating UV light. The UV LEDs 116 may be provided on the same substrate as the other LEDs mentioned above, but in the illustrated example, the UV LEDs 116 are provided as an optional feature. This may be achieved using one or more auxiliary circuit boards 118 (three shown, but any number may be included). These auxiliary circuit board(s) 118 may be located radially outwardly from the main circuit board 112 relative to an axis of rotation of the ceiling fan 100. The arrangement may thus be considered as an annular circuit board comprising a plurality of interconnected boards 112, 118, at least one of which includes a portion having a polygonal perimeter.

The auxiliary circuit board(s) 118 may be connected to the main circuit board 112 including the aforementioned lights by electrical connectors 119. As can be appreciated, this allows for the UV lighting to be added as an optional feature depending on the desires of the user. In view of the auxiliary nature of the associated circuit board 118, this allows for it to be angled or oriented differently from other lighting provided by the main circuit board 112, but the two structures may also be generally coplanar, as shown. As can be understood, this modular circuit board arrangement also allows for replacement of one or more lights, such as the UV LEDs if provided on the auxiliary circuit board 118, without the need to replace the entire uplight module 104, remove the main circuit board 112, or the need to dismount the fan 100 from the ceiling. The UV LEDS 116 may also emit light of a particular ornamental color (e.g., blue) to indicate to the user that the same are activated.

As can be understood, in the illustrated example, the uplight module 104 includes a support in the form of a tray 120 having a generally circular recess 120a bounded by a peripheral lip or wall for blocking light from traveling radially outwardly. The main circuit board 112 may have a generally polygonal perimetrical shape, such as generally triangular or hexagonal, as perhaps best shown in FIG. 5, with truncated ends 112a forming linear edges adapted to fit within the circular recess 120a. However, the polygon could have any number of sides depending on the desired approach (e.g., a pentagon, octagon, or the like), and need not be perfectly polygonal (e.g., it could have rounded corners).

Figure 5:
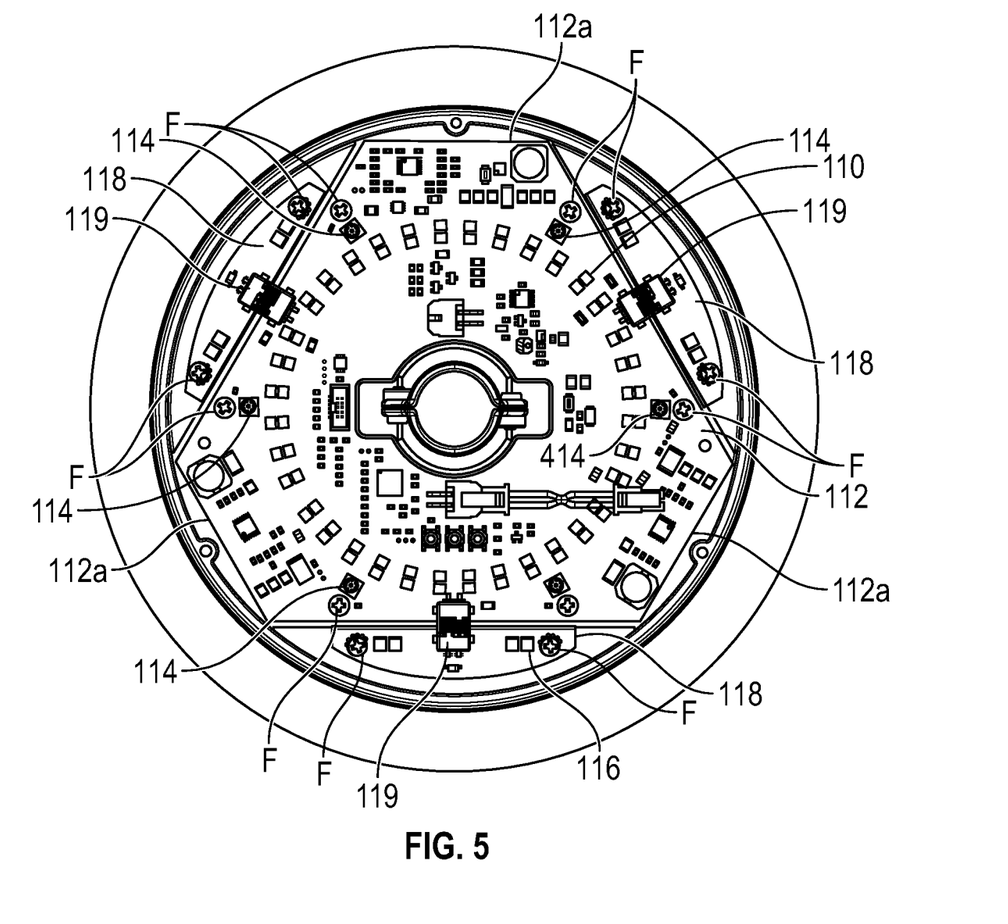
FIG. 5 is a top view of a lighting module.
Figure 6:
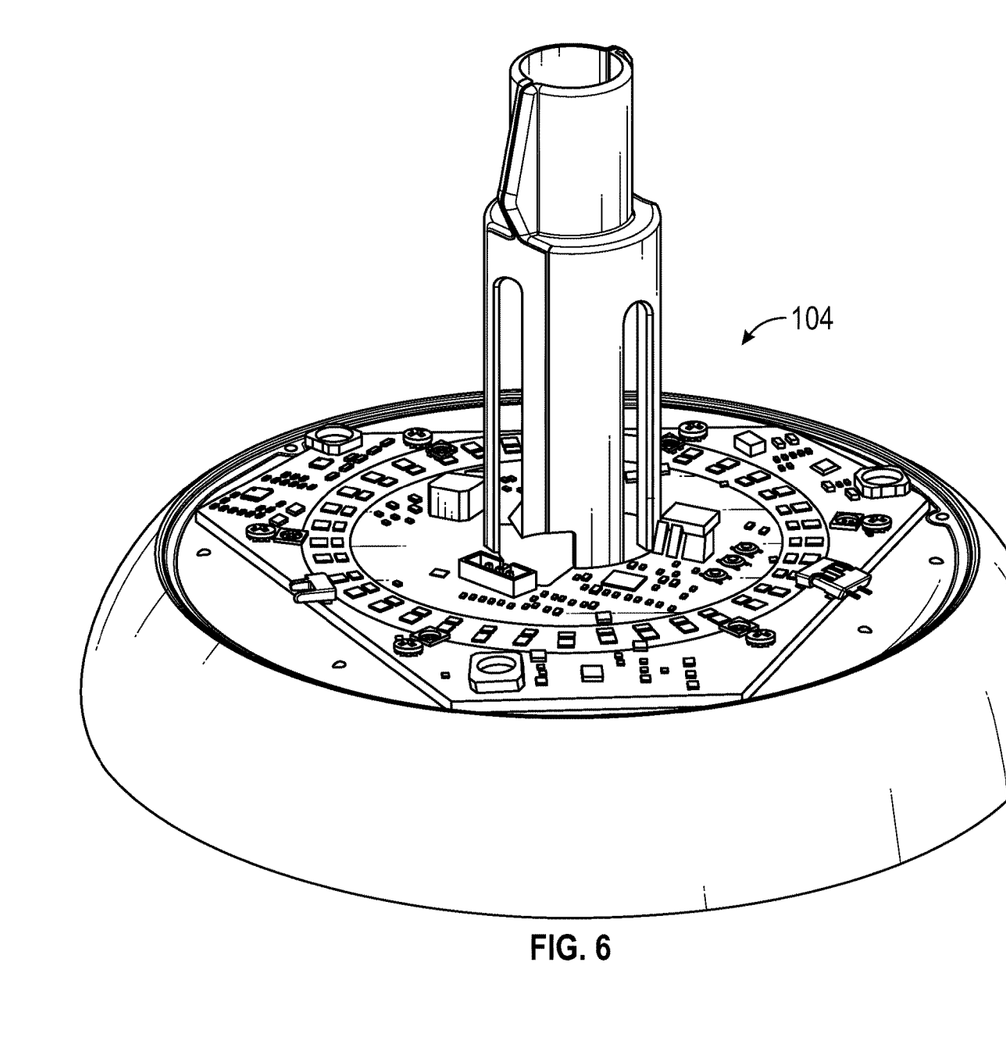
FIG. 6 is another perspective view of a lighting module.

Regardless of the particular shape of the main circuit board 112, the auxiliary circuit board(s) 118 may be adapted to fit between the corresponding perimeter of the main circuit board 112 and within the perimeter of the tray 120, which may be defined by an upstanding lip or wall (compare FIGS. 5 and 6). In the illustrated embodiment, where the main circuit board 112 is hexagonal, the auxiliary circuit board(s) 118 are generally D-shaped in plan view. Thus, when four such boards 112, 118 are assembled as shown, an annular circuit board assembly is formed that fits within the generally circular perimeter of the recessed portion of the tray 120. The associated circuit may also comprise a usage tracker for allowing the user to be notified when the UV LEDs have reached a particular point in their service life, such as their L-50 rating, meaning that it is time for replacement.

The tray 120 may also include a stanchion 122 adapted for receiving a support 124 for suspending the fan 100 from a ceiling, as shown. A cover 126 may also be provided for covering the stanchion 122. As can be appreciated, the main circuit board 112 may also include a central opening O for receiving the support 124 as well as the stanchion 122. Fasteners F may also be used to connect one or both of the main and auxiliary circuit board(s) 112, 118 to the tray 120.

Figure 7:
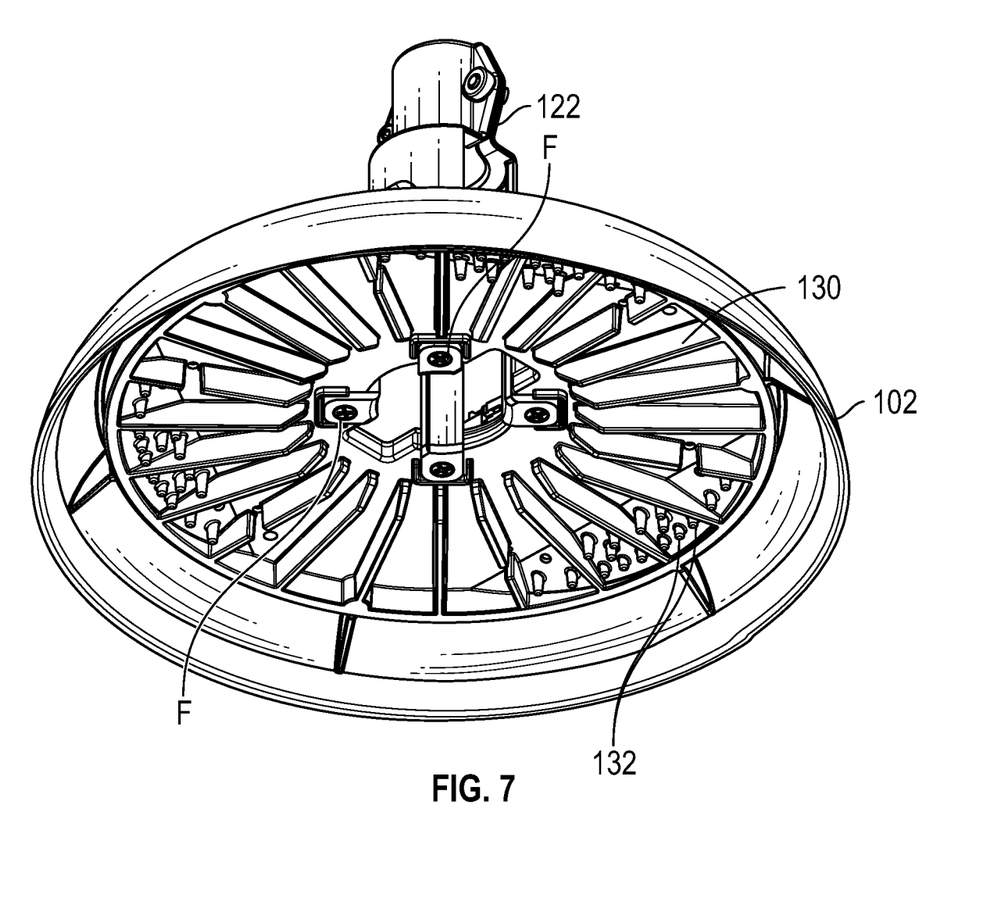
FIG. 7 is a bottom perspective view of a lighting module.
Figure 8:
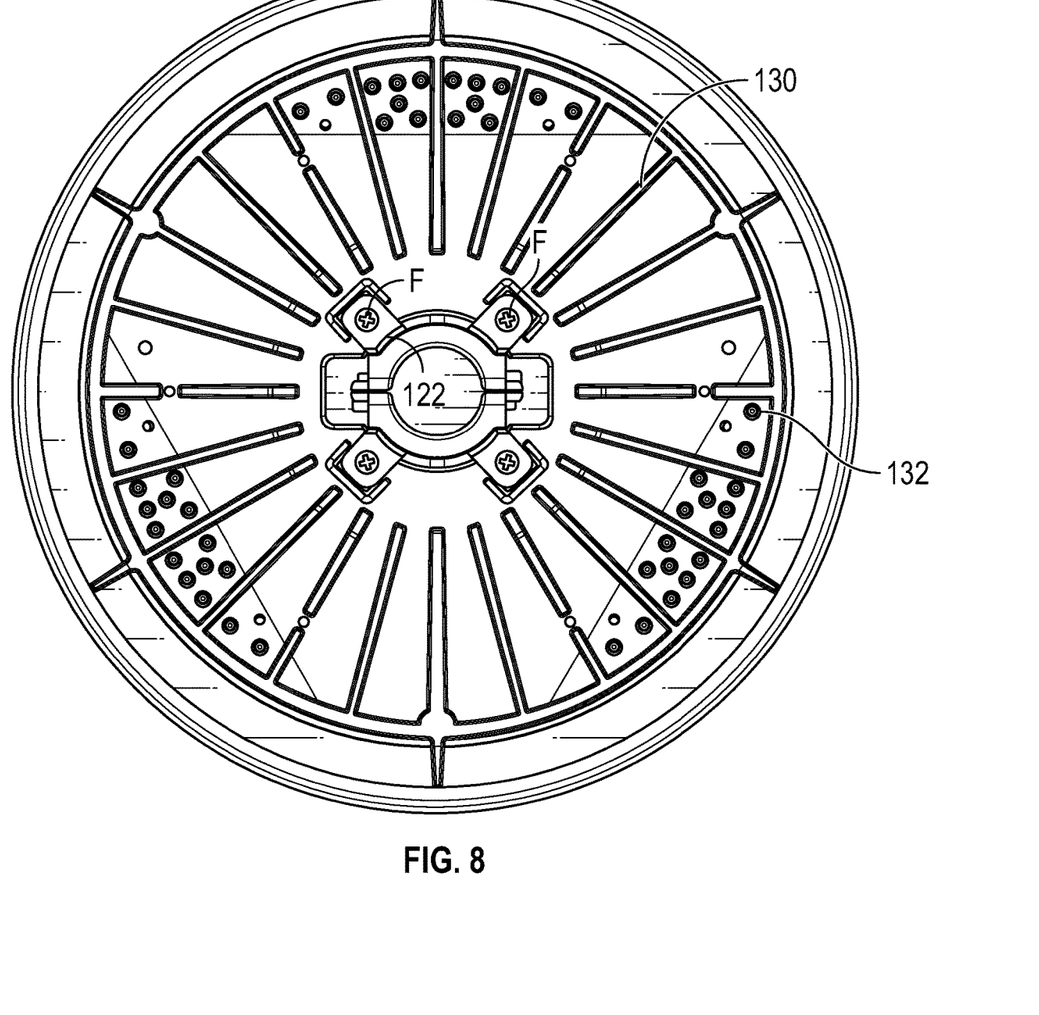
FIG. 8 is a bottom view of a lighting module.

Turning to FIGS. 7 and 8, it can be appreciated that the stanchion 122 may be fastened to the tray 120 as shown using suitable fasteners F. The tray 120 may also comprise a conductive material, such as metal, which may include a plurality of heat dissipating structures, such as first projections in the form of radial fins 130, second projections in the form of 56 depending cylindrical projections 132, which may vary in height, or both types of projections. These structures 130, 132 may aid in further dissipating heat from the LEDs and, in particular, the UV LED(s) on the auxiliary circuit board 118. As can be understood, the radial fins 130 are elongated in a first direction (e.g., radial), and the projections 132 are elongated in a second direction generally transverse to the first direction (e.g., vertical), but do not intersect with each other. As can be appreciated, the first projections in the form of radial fins 130, extend along a portion of the underside of the tray 120 contacting both the main and auxiliary circuit boards 112, 118, but the second projections 132 only extend along a portion of the underside of the tray 120 including the auxiliary circuit board(s) 118.

Figure 9:
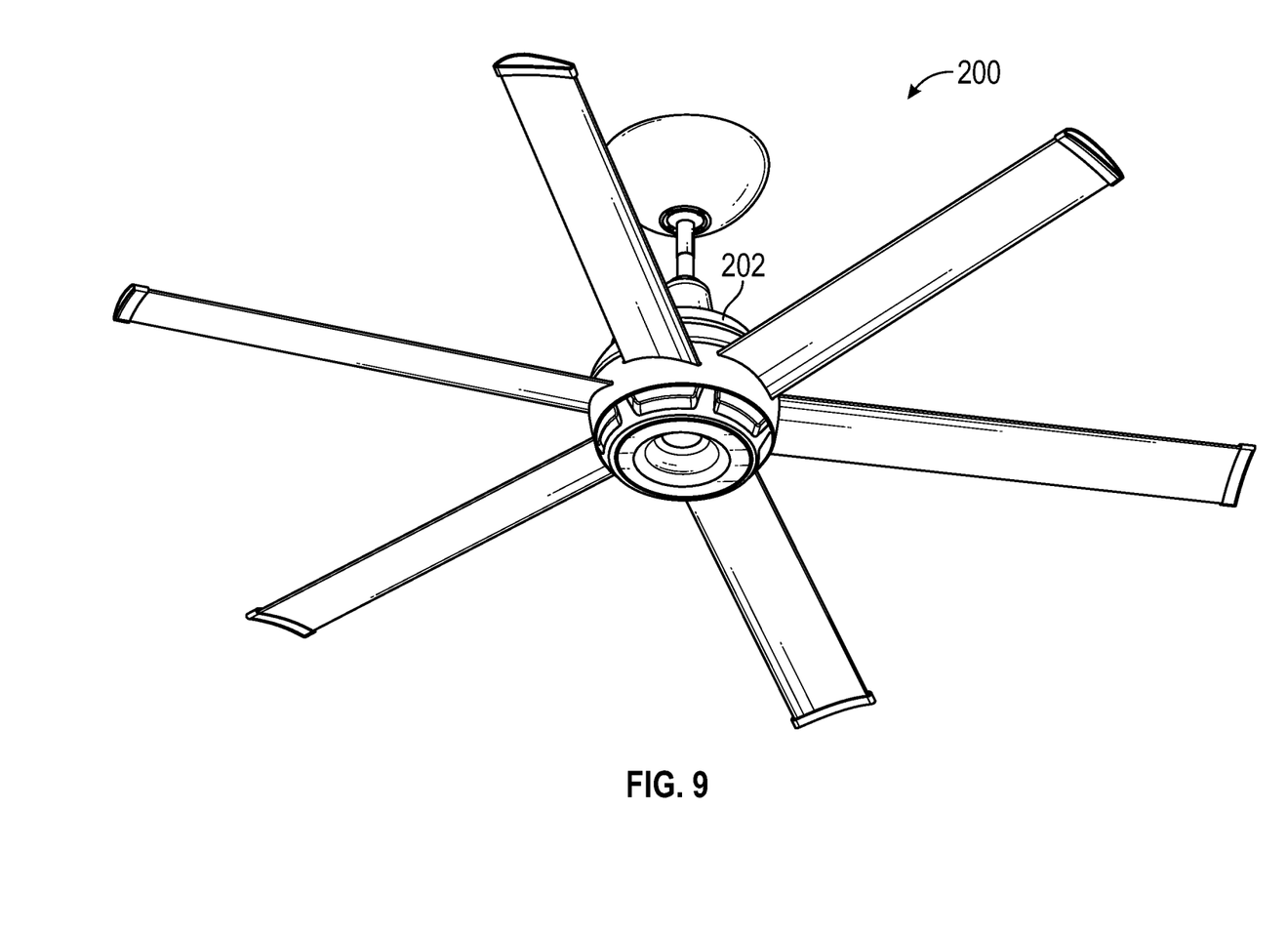
FIGS. 9, 10, and 11 are views of an exemplary fan with uplighting and downlighting capabilities.
Figure 10:
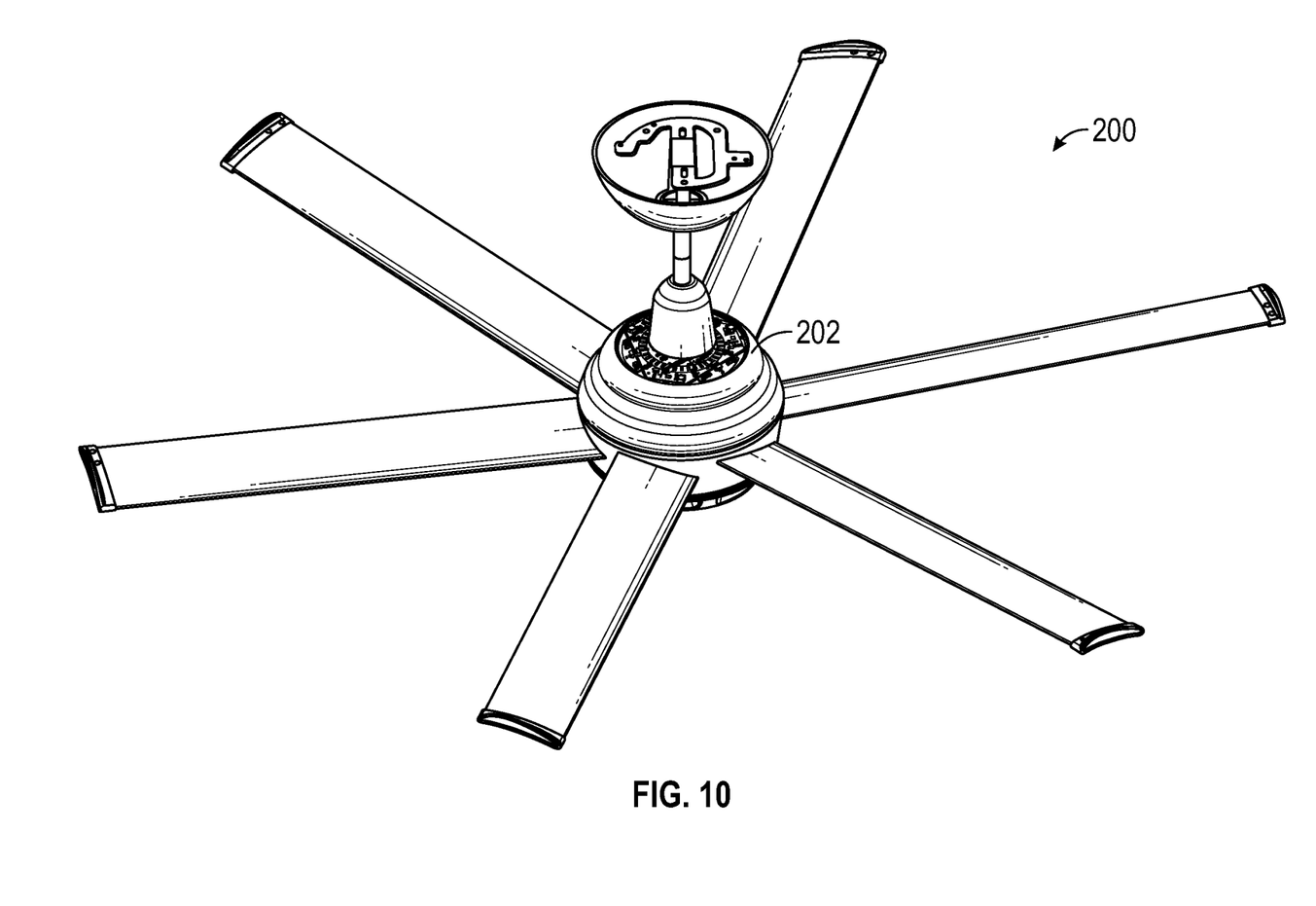
Figure 11:
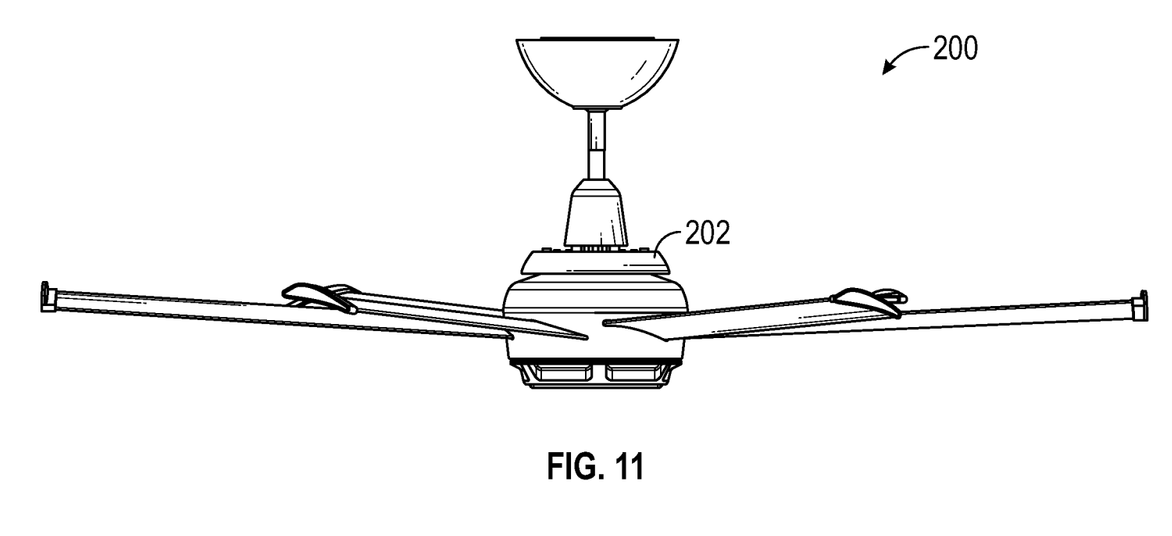

FIGS. 9-11 illustrate a further embodiment of a fan 200 including an uplight module 202, which may be as described above, but without any downlight module, which is considered optional.

Summarizing, this disclosure may be considered to relate to any of the foregoing items in any combination:

1. A ceiling fan for suspending from a ceiling, comprising:
   a hub adapted to be suspended from the ceiling, the hub including at least one fan blade adapted for rotating with the hub; and
   an uplight module having a plurality of lights, each of the plurality of lights adapted to produce a different type of light incident on the ceiling.

2. The ceiling fan of item 1, wherein the plurality of lights comprise at least two LEDs, each for producing light of a different color temperature.

3. The ceiling fan of item 2, further including a controller adapted for toggling between the different color temperatures of light.

4. The ceiling fan of any of items 1-3, wherein the plurality of lights comprise LEDs of different colors.

5. The ceiling fan of any of items 1-4, wherein the plurality of lights comprise one or more LEDs and one or more UV LEDs.

6. The ceiling fan of any of items 1-5, wherein the plurality of lights comprise at least two LEDs for producing light of different temperatures, red, green, and blue LEDS, and at least one UV-C LED.

7. The ceiling fan of any of items 1-6, wherein the plurality of lights comprise LEDs on a main circuit board and UV LEDs on an auxiliary circuit board connected to the main circuit board.

8. The ceiling fan of any of items 1-7, further including a main circuit board and an auxiliary circuit board connected to the main circuit board radially outwardly of the main circuit board.

9. The ceiling fan of any of items 1-8, further including a tray for supporting the plurality of lights, the tray including a peripheral lip.

10. The ceiling fan of any of items 1-9, further including a downlight module.

11. A circuit board assembly, comprising:
    a main circuit board having a generally polygonal perimeter; and
    at least one auxiliary circuit board attached to the generally polygonal perimeter of the main circuit board.

12. The circuit board assembly of item 11, wherein the main circuit board comprises one or more LEDs and the at least one auxiliary circuit board comprises one or more UV LEDs.

13. The circuit board assembly of item 10 or item 11, wherein the main circuit board perimeter is generally triangular or hexagonal.

14. The circuit board assembly of any of items 11-13, further including a plurality of auxiliary circuit boards.

15. The circuit board assembly of item 13, wherein each of the plurality of auxiliary circuit boards is D-shaped in plan view.

16. The circuit board assembly of any of items 13-15, further including a central opening in the main circuit board.

17. A ceiling fan including the circuit board assembly of any of items 11-16.

18. A ceiling fan including the circuit board assembly of item 17, and further including a support adapted to connect to the ceiling passing through the central opening.

19. A circuit board assembly, comprising:
    a main circuit board having a generally polygonal perimeter; and
    at least one auxiliary circuit board attached to the main circuit board, the at least one auxiliary circuit board comprising at least one LED for producing UV light.

20. A ceiling fan including the circuit board assembly of item 19.

21. A circuit board assembly, comprising:
an annular circuit board comprising a plurality of interconnected boards, at least one of which includes a generally polygonal perimeter.

22. The circuit board assembly of item 21, wherein the circuit board assembly comprises:
a main circuit board having the portion with the generally polygonal perimeter; and
at least one auxiliary circuit board attached to the main circuit board along a portion of the generally polygonal perimeter.

23. A ceiling fan including the circuit board assembly of item 21.

24. An apparatus for dissipating heat from a circuit board having one or more LEDs thereon, comprising:
a plurality of first projections extending in a first direction; and
a plurality of second projections extending in a second direction generally transverse to the first direction.

25. The apparatus of item 24, wherein the circuit board is annular, the first direction is radial, and the second direction is vertical.

26. The apparatus of item 24 or item 25, wherein the circuit board comprises a main portion and an auxiliary portion, the first projections being associated with both the main and auxiliary portions, and the second projections being associated with only the auxiliary portion.

27. A ceiling fan including the apparatus of any of items 24-26.

28. A fan for mounting to a ceiling, comprising:
a rotatable hub including a plurality of blades;
a support for supporting the fan from the ceiling; and
a lighting assembly including a first circuit board surrounding the support and a second circuit board attached to the first circuit board.

29. The fan of item 28, wherein the second circuit board is radially outward of the first circuit board.

30. The fan of item 28 or item 29, wherein the first circuit board comprises a generally polygonal perimeter.

31. The fan of any of items 28-30, wherein the second circuit board is generally D-shaped in plan view.

32. The fan of any of items 28-31, further including a tray having a recess for receiving the first circuit board and the second circuit board, the tray having a raised peripheral lip.

33. The fan of any of items 28-32, further including a plurality of second circuit boards attached to the first circuit board.

34. The fan of any of items 28-33, wherein the second circuit board comprises one or more LEDs and the second circuit board(s) comprises one or more UV-LEDs.

35. The fan of any of items 28-34, wherein the lighting assembly comprises a heat sink including a plurality of radially extending fins associated with at least the first circuit board and a plurality of vertically extending projections associated with the second circuit board.

36. The fan of any of items 28-35, wherein the lighting assembly comprises an uplight located above the hub.

37. The fan of any of items 28-36, further including a downlight.

38. A ceiling fan, comprising:
a uplight module adapted to generate UV light; and
a controller adapted to control the intensity of the UV light output from the uplight module from among pre-selected values.

39. The ceiling fan of item 38, wherein the controller comprises switches for controlling the intensity of the UV light output from the up light module.

40. A method comprising projecting a plurality of different types of light upwardly from a ceiling fan so as to be incident on the ceiling.

41. The method of item 40, wherein the plurality of different types of light comprise light of different temperatures, colors, germicidal capabilities, or any combination thereof.

42. The method of item 40 or item 41, further including the step of projecting light downwardly from the ceiling fan.

43. A method of manufacturing a ceiling fan, comprising:
passing a support for the ceiling fan through a circular opening in a main circuit board for controlling the ceiling fan; and
attaching one or more auxiliary circuit boards to the main circuit board.

44. The method of item 43, wherein the main circuit board comprises one or more LEDs.

45. The method of item 43 or item 44, wherein at least one of the one or more auxiliary circuit boards comprises a UV LED.

46. The method of any of items 43-45, wherein the attaching step comprises connecting the one or more auxiliary circuit boards to a perimeter of the main circuit board.

Any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Each of the following terms written in singular grammatical form: "a", "an", and "the", as used herein, means "at least one", or "one or more". Use of the phrase "one or more" herein does not alter this intended meaning of "a", "an", or "the". Accordingly, the terms "a", "an", and "the", as used herein, may also refer to, and encompass, a plurality of the stated entity or object, unless otherwise specifically defined or stated herein, or the context clearly dictates otherwise. For example, the phrases: "a unit", "a device", "an assembly", "a mechanism", "a component," "an element", and "a step or procedure", as used herein, may also refer to, and encompass, a plurality of units, a plurality of devices, a plurality of assemblies, a plurality of mechanisms, a plurality of components, a plurality of elements, and a plurality of steps or procedures, respectively.

Each of the following terms: "includes", "including", "has", "having", "comprises", and "comprising", and, their linguistic/grammatical variants, derivatives, or/and conjugates, as used herein, means "including, but not limited to", and is to be taken as specifying the stated components), feature(s), characteristic(s), parameter(s), integer(s), or step(s), and does not preclude addition of one or more additional component(s), feature(s), characteristic(s), parameter(s), integer(s), step(s), or groups thereof. Each of the phrases "consisting of" and "consists of, as used herein, means "including and limited to". The phrase "consisting essentially of" means that the stated entity or item (system, system unit, system sub-unit device, assembly, sub-assembly, mechanism, structure, component element or, peripheral equipment utility, accessory, or material, method or process, step or procedure, sub-step or sub-procedure), which is an entirety or part of an exemplary embodiment of the disclosed invention, or/and which is used for implementing an exemplary embodiment of the disclosed invention, may include at least one additional feature or characteristic being a system unit system sub-unit device, assembly, sub-assembly, mechanism, structure, component or element or, peripheral equipment utility, accessory, or material, step or procedure, sub-step or sub-procedure), but only if each such additional feature or characteristic does not materially alter the basic novel and inventive characteristics or special technical features, of the claimed item.

The term "method", as used herein, refers to steps, procedures, manners, means, or/and techniques, for accomplishing a given task including, but not limited to, those steps, procedures, manners, means, or/and techniques, either known to, or readily developed from known steps, procedures, manners, means, or/and techniques, by practitioners in the relevant field(s) of the disclosed invention.

Terms of approximation, such as the terms about, substantially, approximately, generally, etc., as used herein, refer to ±10% of the stated numerical value or as close as possible to a stated condition.

It is to be fully understood that certain aspects, characteristics, and features, of the invention, which are, for clarity, illustratively described and presented in the context or format of a plurality of separate embodiments, may also be illustratively described and presented in any suitable combination or sub-combination in the context or format of a single embodiment. Conversely, various aspects, characteristics, and features, of the invention which are illustratively described and presented in combination or sub-combination in the context or format of a single embodiment may also be illustratively described and presented in the context or format of a plurality of separate embodiments.

Having shown and described various embodiments, further adaptations of the inventive aspects described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not necessarily required. Accordingly, the scope of the invention should be considered in terms of the claims and is understood not to be limited to the details of structure and operation shown and described in the specification and drawings.

The invention claimed is:

1. A ceiling fan for suspending from a ceiling, comprising:
a hub adapted to be suspended from the ceiling, the hub including at least one fan blade adapted for rotating with the hub;
an uplight module having a plurality of lights, each of the plurality of lights adapted to produce a different type of light incident on the ceiling;
wherein the plurality of lights comprise at least two LEDs, each for producing light of a different color temperature; and
a main circuit board including the at least two LEDs and an auxiliary circuit board connected to the main circuit board, the auxiliary circuit board including a plurality of UV LEDs.

2. The ceiling fan of claim 1, further including a controller adapted for toggling between the different color temperatures of light produced by each one of the at least two LEDs.

3. The ceiling fan of claim 1, wherein the plurality of lights comprise LEDs for producing light of different colors.

4. The ceiling fan of claim 1, wherein the plurality of lights further comprise red, green, and blue LEDs.

5. The ceiling fan of claim 1, wherein the auxiliary circuit board is connected to the main circuit board radially outwardly of the main circuit board.

6. The ceiling fan of claim 1, further including a tray for supporting the plurality of lights, the tray including a peripheral lip.

7. The ceiling fan of claim 1, further including a downlight module.

8. The ceiling fan of claim 1, wherein the plurality of LEDs are arranged in concentric rows.

* * * * *